United States Patent [19]

Matoba et al.

[11] Patent Number: 4,491,429
[45] Date of Patent: Jan. 1, 1985

[54] BUSHING ASSEMBLY FOR SUSPENSION ARM

[75] Inventors: Taketo Matoba; Yasuhiro Morita, both of Okazaki; Noritoshi Arai, Toyota; Masahiro Ishigaki, Ibaragi; Hiroshi Harada, Tsu, all of Japan

[73] Assignees: Toyota Jidosha Kabushiki Kaisha, Toyota; Toyo Gomu Kogyo Kabushiki Kaisha, Osaka, both of Japan

[21] Appl. No.: 452,826

[22] Filed: Dec. 23, 1982

[30] Foreign Application Priority Data

Dec. 29, 1981 [JP] Japan ................................ 56-196792

[51] Int. Cl.³ .................. F16C 27/06; B60G 11/22; F16F 1/14; F16D 1/00
[52] U.S. Cl. .................................. 384/221; 384/222; 267/63 A; 267/154; 403/228
[58] Field of Search ............... 384/221, 222, 220, 215, 384/275, 295-300; 267/153, 154, 140.4, 57.1 R, 141.1, 141.4, 57.1 A, 63 A; 464/96, 94, 180, 71; 280/716, 717, 695, 671, 673; 403/220-228

[56] References Cited

U.S. PATENT DOCUMENTS

| 1,758,712 | 5/1930 | Morris | 384/296 |
| 3,009,746 | 11/1961 | Haushalter | 384/222 |
| 3,515,407 | 6/1970 | Zimmerman | 384/222 X |
| 3,781,073 | 12/1973 | Jörn et al. | 384/220 X |
| 4,286,827 | 9/1981 | Peterson et al. | 384/221 |

FOREIGN PATENT DOCUMENTS

| 498576 | 2/1951 | Belgium | 384/215 |
| 1219563 | 5/1960 | France | 267/63 A |
| 1257429 | 2/1961 | France | 384/220 |

Primary Examiner—Stuart S. Levy
Assistant Examiner—Thomas R. Hannon
Attorney, Agent, or Firm—Oblon, Fisher, Spivak, McClelland & Maier

[57] ABSTRACT

A bushing assembly incorporated in an eye of a suspension arm for an automobile includes a cylindrical member, a cylindrical rubber bushing adhered to the outer peripheral surface of the member and press fitted in the eye, and a cylindrical insert embedded in the bushing. The bushing is provided on each end with a flange extending radially outward and contacting each end surface of the eye when the bushing has been fitted in the eye.

6 Claims, 2 Drawing Figures

BUSHING ASSEMBLY FOR SUSPENSION ARM

BACKGROUND OF THE INVENTION

1. Field of the Invention:

This invention relates to a bushing assembly incorporated in the eyes of a suspension arm provided for a suspension system of an automobile.

2. Description of the Prior Art:

A bushing assembly for a suspension arm generally includes an inner iron tube, outer iron tube and tubular rubber bushing disposed between each of said tubes and adhered to the outer peripheral surface of the inner tube and the inner peripheral surface of the outer tube, respectively. In the use of the bushing assembly the outer tube is press fitted in an eye of a suspension arm.

The outer tube may be provided on one end with a flange extending radially outward and abutting against an end of the eye when said bushing assembly is press fitted. However, the outer tube cannot be provided on the other end with a flange since it prevents the outer tube from being press fitted in the eye. Thus, resistance for the outer tube to be drawn, in the use of the bushing assembly, against axial force directed from the end without the flange to that with the flange is small.

Also, in the former bushing assembly, the ratio of spring constant in the direction orthogonal to the axis of the bushing to spring constant in the axial direction is limited to about 10. However, bushings having a larger ratio may be necessitated for providing a good ride and improved maneuverability as well as for reducing vibration and noise.

SUMMARY OF THE INVENTION

Accordingly, an object of the present invention is to provide a bushing assembly having large resistance against an axial force and large ratio of spring constant.

According to the present invention, a bushing assembly is provided which is incorporated in an eye of a suspension arm for an automobile. The bushing assembly comprises a cylindrical metal member, a cylindrical rubber bushing adhered to the outer peripheral surface of the member and press fitted in said eye, said bushing being provided on each end with a flange extending radially outward, and a cylindrical insert formed of material harder than said bushing and embedded in said bushing, each said flange contacting each end surface of said eye when said bushing assembly has been press fitted into said eye.

These and other objects and features of the present invention will be apparent from the following description with reference to the drawings.

DETAILED DESCRIPTION OF THE PREFERRED EMBODIMENT

Figure 1:
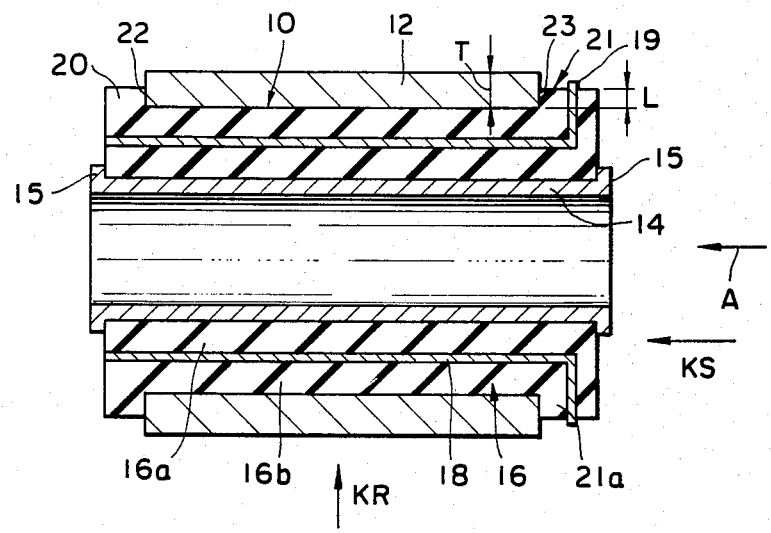
FIG. 1 is a sectional view showing a bushing assembly according to the present invention.

As shown in FIG. 1, a bushing assembly 10 according to the present invention is incorporated in an eye 12 provided in an end of a suspension arm (not shown) and comprises a cylindrical metal member 14, bushing 16 and insert 18 in the bushing. Said suspension arm may be one such as upper and lower arms of a Wishbone type, an arm of a strut type, an arm of a trailing type and control arms of a four link type.

Said eye 12 together with the bushing assembly 10 is connected to a car body (not shown) by a bolt (not shown) inserted into the member 14. In the embodiment shown, the member 14 is provided on both axial ends with flanges 15, respectively.

The bushing 16 is formed of cylindrical rubber, vulcanized and adhered to said member 14. Firm adhesion of the bushing to said member 14 prevents the bushing 16 from axial movement relative to the member 14 so that said flanges 15 may be omitted. This bushing 16 has the outer diameter larger than the inner diameter of said eye 12 before the incorporation in the eye, and the bushing 16 is provided on both axial ends with flanges 20, 21 extending radially outward respectively. These flanges 20, 21 contact both end surfaces 22, 23 of the eye to hold the eye when the bushing assembly 10 has been press fitted in said eye 12. Thus, the bushing assembly 10 can be prevented from withdrawal from the eye 12. For that purpose, the larger the outer diameter of the flanges 20, 21 is, the better. On the other hand, the extremely large outer diameter of the flanges 20, 21 makes the press fit operation difficult when the bushing 16 is press fitted into the eye 12 as will be described later. Thus, taking both into consideration, the diameter of the flanges 20, 21 is determined properly such that an amount L of the flanges 20, 21 extending radially outward is approximately a half of wall thickness T of the eye 12, as shown in the drawing.

Figure 2:
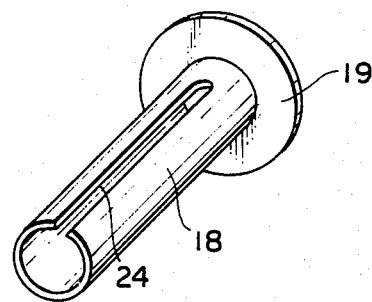
FIG. 2 is a perspective view of an insert in the bushing shown in FIG. 1.

The insert 18 is embedded in said bushing 16. This insert 18 serves to increase the spring constant KR in the direction orthogonal to the axis of the bushing 16, i.e. in the radial direction and is formed of cylindrical metal or plastic harder than the bushing 16. This insert 18 is arranged coaxially with the member 14. To increase fully said spring constant KR, it is preferable that this insert 18 applies radial compressive force to a portion 16a of the bushing 16 located between the insert 18 and the member 14. For that purpose, it is preferable that the insert 18, as shown in FIG. 2, has a single or plurality of slits 24 extending axially from a cylindrical portion. In the presence of the slit 24, when the bushing 16 is press fitted into the eye 12, the compressive force transmitted from a portion 16b of the bushing located on the outside of the insert 18 displaces the insert 18 inward so that the compressive force will be given to the portion 16a of the bushing located inside. Further, depending upon the value of the spring constant KR to be set, the insert 18 may be shaped into a complete cylinder without the slit or halved axially into semicylinders. In the latter case, the two semicylinders may be abutted to form a cylinder as a whole.

In the embodiment shown, the insert 18 is integrally provided on one end with a flange 19 which is embedded in one flange 21 of said bushing 16. By such provision of the flange 19 is compressed a portion 21a of the flange 21 of the bushing 16 between the flange 19 of the insert 18 and the end surface 23 of the eye 12 when the bushing 16 is subjected to axial force in the direction A, so that the spring constant of the bushing in this direction can be increased.

Member 14, bushing 16 and insert 18 are integrally adhered to each other by molding and vulcanizing. The bushing assembly 10 thus molded is press fitted into the eye 12 from the flange 20 side. When the flanges 20, 21 of the bushing 16 engage the end surfaces 22, 23 of the eye 12, the incorporation of the bushing assembly 10 is completed. The bushing 16 will be subjected to the compressive force directed radially inward from the eye 12 by said press fit. Consequently, the radial spring constant KR of the bushing 16 is increased.

To add said radial compressive force to the bushing 16 itself, for example, a steel outer tube may be arranged between the outer peripheral surface of the bushing 16 and the inner peripheral surface of the eye 12 so that the compressive force may be applied to the bushing through said outer tube, the insert 18 in the bushing 16 and the member 14. However, since the outer tube is provided individually, the number of parts is increased and the weight is also increased correspondingly. Further, the steel outer tube cannot have two flanges corresponding to the two flanges 20, 21 provided on the bushing 16, but rather only one flange. Thus, when the outer tube has been press fitted into the eye 12, blocking force is weak which counteracts against axial withdrawal force directed from the end without the flange to that with flange.

According to the present invention, said disadvantage in the provision of any individual outer tube can be eliminated by direct press fitting of the bushing into the eye. While the radial spring constant KR of the bushing is fully increased by the press fitting of the bushing into the eye and the action of the insert, compared with that of the former bushing, the axial spring constant KS is kept substantially the same as that of the former bushing. Thus, the bushing assembly according to the present invention can be set to have a KR/KS ratio of from 15-20.

The bushing assembly according to the present invention can have the radial spring constant KR of the bushing set to be large by incorporating integrally the insert in the interior of the bushing and press fitting the bushing into the eye. As a result, requirements for a good ride and stable maneuverability can be met. Also, since the bushing is incorporated in press fit, endurance performance of the bushing can be improved. Furthermore, since the flanges of the bushing can be improved. In addition since the flanges of the bushing engage both end surfaces of the eye respectively, resistance of the bushing against the withdrawal force becomes large so that occurrence of accident such as withdrawal of the bushing from the eye can be prevented.

What is claimed is:

1. A bushing assembly incorporated in an eye of a suspension arm for an automobile, comprising:
   a cylindrical metal member;
   a cylindrical rubber bushing adhered to the outer peripheral surface of said member, press fitted into said eye and provided on each end with a flange extending radially outward; and
   a cylindrical insert formed of material harder than the bushing and being provided with at least one slit extending axially from a complete cylindrical portion at one end thereof and embedded in the bushing, each said flange contacting each end surface of the eye when said bushing has been press fitted into said eye.

2. A bushing assembly as claimed in claim 1, wherein said member is provided on each end with a flange extending radially outward and contacting each end surface of said bushing.

3. A bushing assembly as claimed in claim 1, wherein said insert is provided on one end with a flange extending radially outward.

4. A bushing assembly as claimed in claim 1, wherein said bushing assembly has a value of KR/KS of 15-20 wherein KR is a radial spring constant of said bushing assembly and KS is an axial spring constant of said bushing assembly.

5. A bushing assembly incorporated in an eye of a suspension arm for an automobile, comprising:
   a cylindrical metal member provided on each end with a flange extending radially outward;
   a cylindrical rubber bushing adhered to the outer peripheral surface of said member with each end surface thereof contacting said flange of the member, said bushing being press fitted into said eye and provided on each end with a flange extending radially outward; and
   a cylindrical insert formed of material harder than the bushing and being provided with at least one slit extending axially from a complete cylindrical portion at one end thereof and embedded in the bushing, said insert being provided with at least a slit extending axially and on one end with a flange extending radially outward, each said flange of said bushing contacting each end surface of the eye when said bushing has been press fitted into the eye.

6. A bushing assembly as claimed in claim 5, wherein said bushing assembly has a value of KR/KS of 15-20 wherein KR is a radial spring constant of said bushing assembly and KS is an axial spring constant of said bushing assembly.

* * * * *